US012446641B2

(12) United States Patent
Rainey

(10) Patent No.: US 12,446,641 B2
(45) Date of Patent: Oct. 21, 2025

(54) PROTECTIVE WRISTWATCH SLEEVE DEVICE

(71) Applicant: Jimmy Rainey, Counce, TN (US)

(72) Inventor: Jimmy Rainey, Counce, TN (US)

( * ) Notice: Subject to any disclaimer, the term of this patent is extended or adjusted under 35 U.S.C. 154(b) by 632 days.

(21) Appl. No.: 17/881,319

(22) Filed: Aug. 4, 2022

(65) Prior Publication Data

US 2024/0045379 A1 Feb. 8, 2024

(51) Int. Cl.
*A41D 20/00* (2006.01)
*G04B 37/00* (2006.01)

(52) U.S. Cl.
CPC ............ *A41D 20/00* (2013.01); *G04B 37/005* (2013.01)

(58) Field of Classification Search
CPC .... A41D 20/00; A41D 13/088; A41D 20/005; A41D 13/06; A41D 13/065; A41D 13/08; A41D 13/081; A44C 5/00; A44C 5/14; A45C 11/10; G04B 37/005; G04B 47/02; A61F 5/0109; A61F 2013/00093; A61F 2013/00119; A61F 2013/00238; A61F 2013/00242; A61F 13/107
USPC .............................. 2/170, 59, 60; 602/63, 64
See application file for complete search history.

(56) References Cited

U.S. PATENT DOCUMENTS 1,857,195 A 5/1932 Karpf
2,249,550 A * 7/1941 Williams ................ A44C 5/00 368/291
2,344,136 A * 3/1944 Harold ................. G04B 37/005 968/300
2,584,270 A * 2/1952 Hucknall ............. G04B 37/005 968/300
5,823,012 A * 10/1998 Hacskaylo ............... D04B 1/24 66/171
5,838,642 A 11/1998 Tully
6,192,519 B1 * 2/2001 Coalter ................ A41D 13/088 2/16
7,175,340 B1 2/2007 Kinney
8,661,567 B1 * 3/2014 Hoover .................. A41D 20/00 2/170
8,677,515 B2 3/2014 Ishihara
D1,006,398 S * 12/2023 Blythe ........................... D2/610
12,108,851 B1 * 10/2024 Ciaciuch ................ A45C 11/10
(Continued)

FOREIGN PATENT DOCUMENTS

DE 202011102635 U1 * 9/2011 ............. A41D 13/08
KR 200406754 Y1 * 1/2006
KR 20170019906 A * 2/2017

OTHER PUBLICATIONS

KR 200406754 English translation (Doc Pub) (Year: 2004).*

*Primary Examiner* — Amy Vanatta

(57) ABSTRACT

A protective wristwatch sleeve device for protecting a wristwatch or other wrist-worn device during use includes a sleeve defining an interior space, the sleeve has a pair of edges, each edge defining an associated opening to the interior space. The sleeve is elastically stretchable and is configured for stretching for wearing about a wrist and a wristwatch, thereby shielding the wristwatch from a debris. The sleeve has an inner layer adjacent to the interior space with an inner surface facing the interior space. The inner layer is elastically stretchable and soft and is configured for abutting the wristwatch when the sleeve is worn. The sleeve also includes an outer layer which is elastically stretchable and has an outer surface facing away from the inner layer.

9 Claims, 5 Drawing Sheets

(56) References Cited

U.S. PATENT DOCUMENTS

| | | | | |
|---|---|---|---|---|
| 2007/0107456 | A1 | 5/2007 | Yeager | |
| 2008/0141436 | A1* | 6/2008 | Morgan | B63C 11/02 2/170 |
| 2011/0032086 | A1 | 2/2011 | Cabrera | |
| 2012/0061430 | A1* | 3/2012 | Hall | A44C 5/00 224/164 |
| 2016/0262470 | A1* | 9/2016 | Blythe | D04B 1/12 |
| 2020/0029636 | A1* | 1/2020 | Kelly | A41D 20/00 |

* cited by examiner

PROTECTIVE WRISTWATCH SLEEVE DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to watch protection devices and more particularly pertains to a new watch protection device for protecting a wristwatch or other wrist-worn device during use.

(2) Description of Related Art Including Information Disclosed Under 37 CFR 1.97 and 1.98

The prior art relates to watch protection devices. One such device disclosed by the prior art incorporates a transparent material with two pairs of elastic bands on either side of the wristwatch to keep water away from the wristwatch while enabling viewing of the device through the transparent material. Another device incorporates an openable flap onto a wristwatch strap so that the face of the watch is protected but can be revealed by opening the flap. However, the prior art does not disclose a device which comprises an elastic material throughout for elastically stretching to be worn on a wrist and wristwatch, thereby protecting the wristwatch from scratches or other physical damage while being capable of being stretched back for access or viewing of the wristwatch.

(h) BRIEF SUMMARY OF THE INVENTION

An embodiment of the disclosure meets the needs presented above by generally comprising a sleeve defining an interior space, the sleeve has a pair of edges, each edge defining an associated opening to the interior space. The sleeve is elastically stretchable and is configured for stretching for wearing about a wrist and a wristwatch, thereby shielding the wristwatch from a debris. The sleeve has an inner layer adjacent to the interior space with an inner surface facing the interior space. The inner layer is elastically stretchable and soft and is configured for abutting the wristwatch when the sleeve is worn. The sleeve also includes an outer layer which is elastically stretchable and has an outer surface facing away from the inner layer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
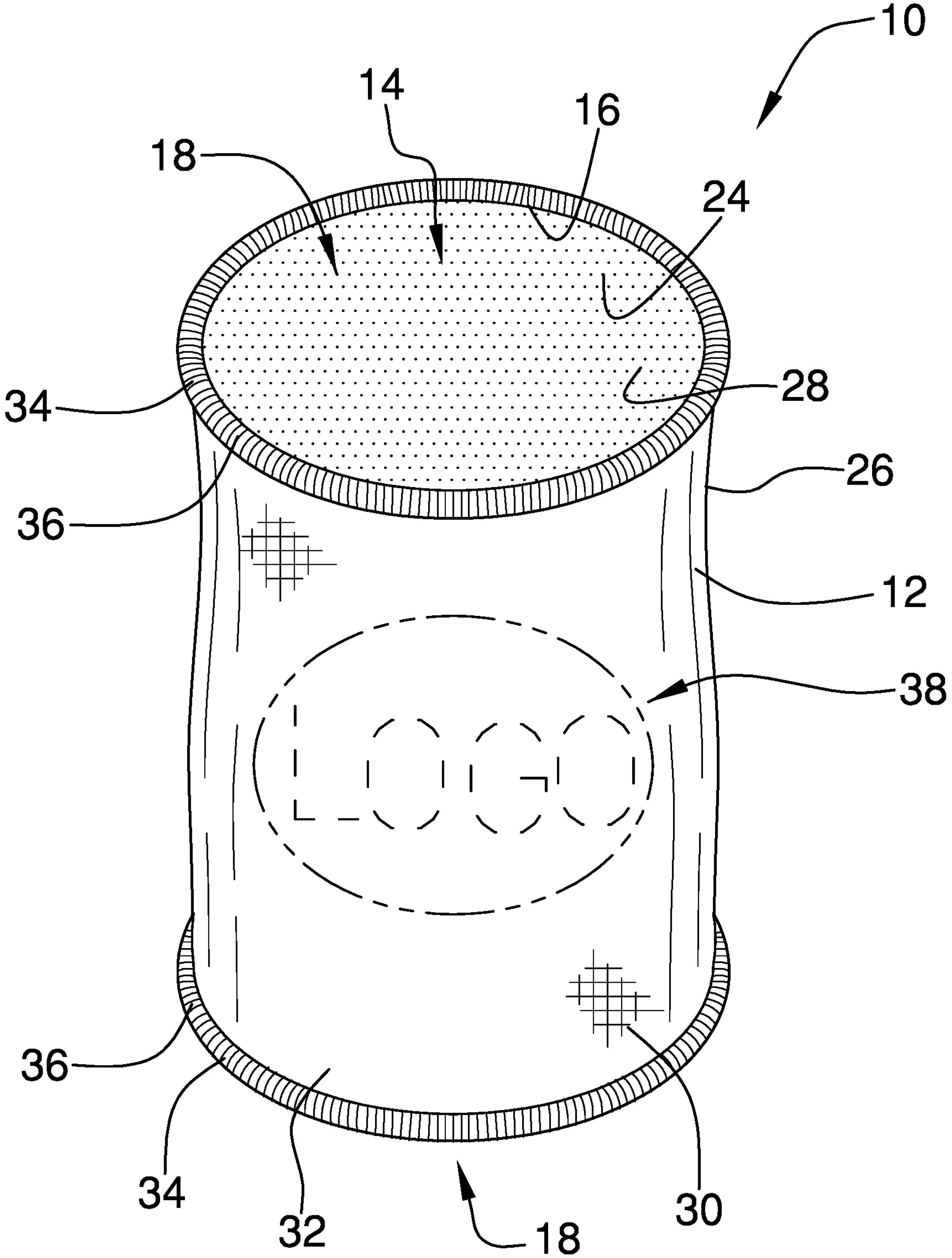
FIG. 1 is a top front perspective view of a protective wristwatch sleeve device according to an embodiment of the disclosure.
Figure 2:
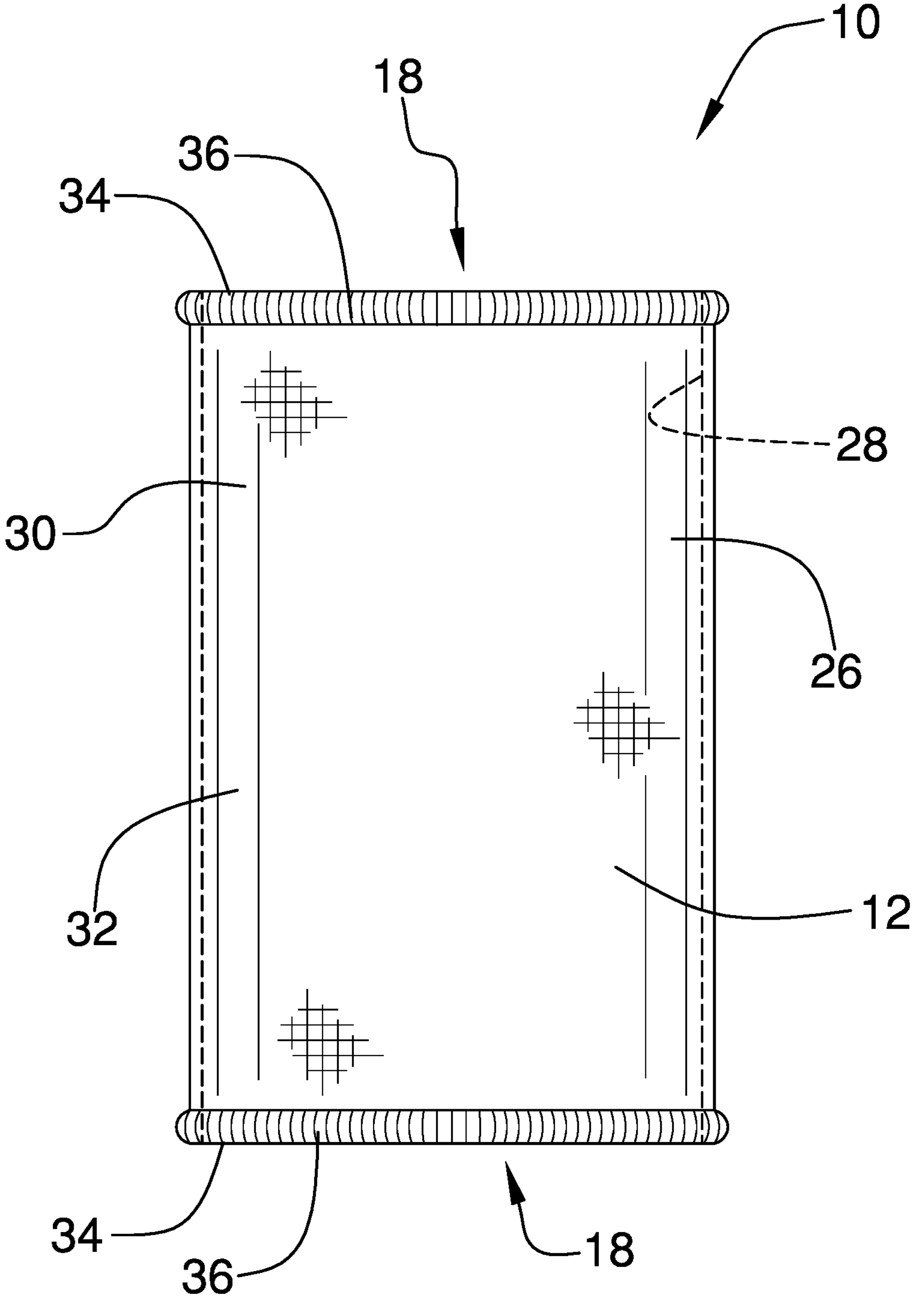
FIG. 2 is a rear view of an embodiment of the disclosure.
Figure 3:
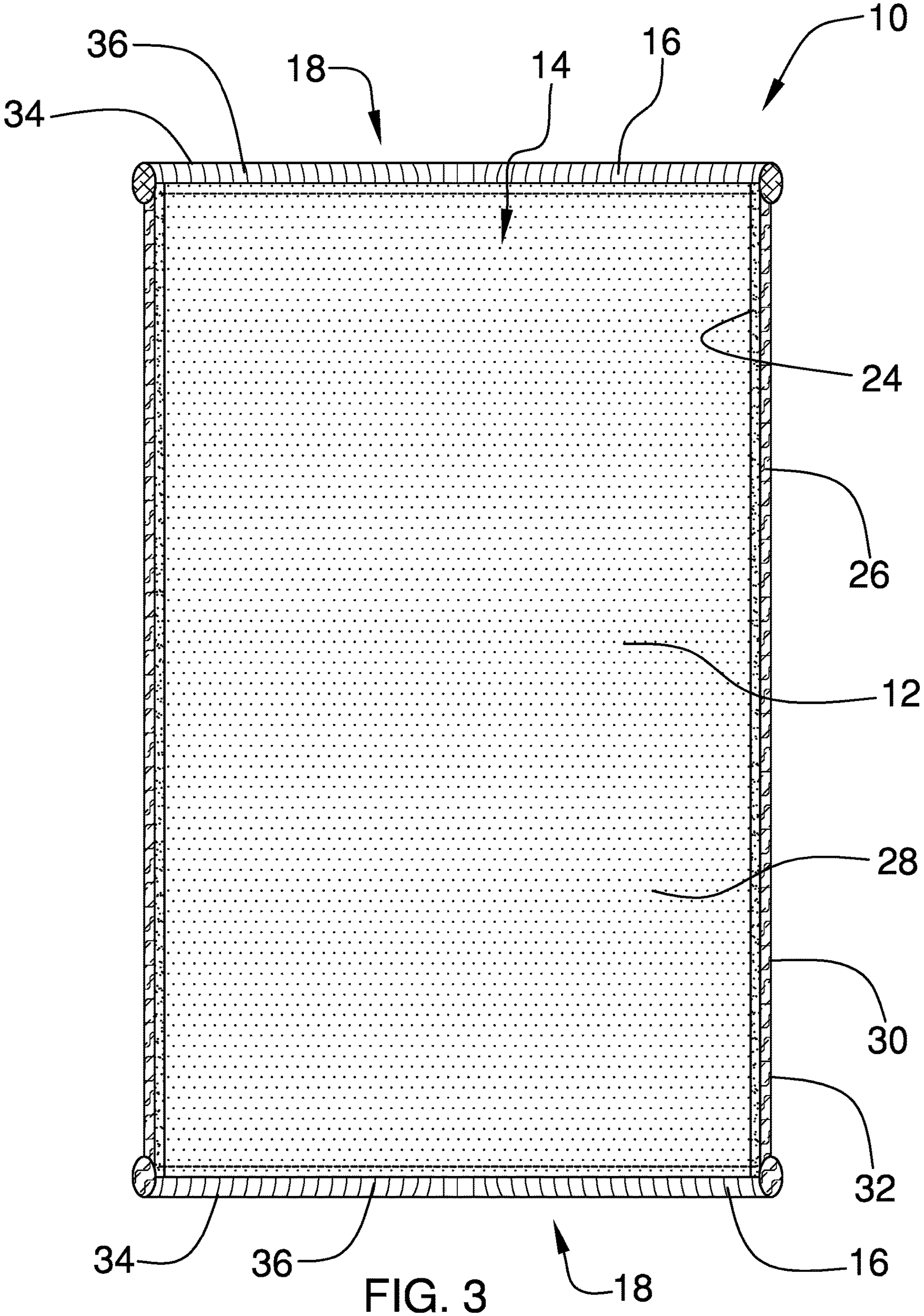
FIG. 3 is a front cross-sectional view of an embodiment of the disclosure.
Figure 4:
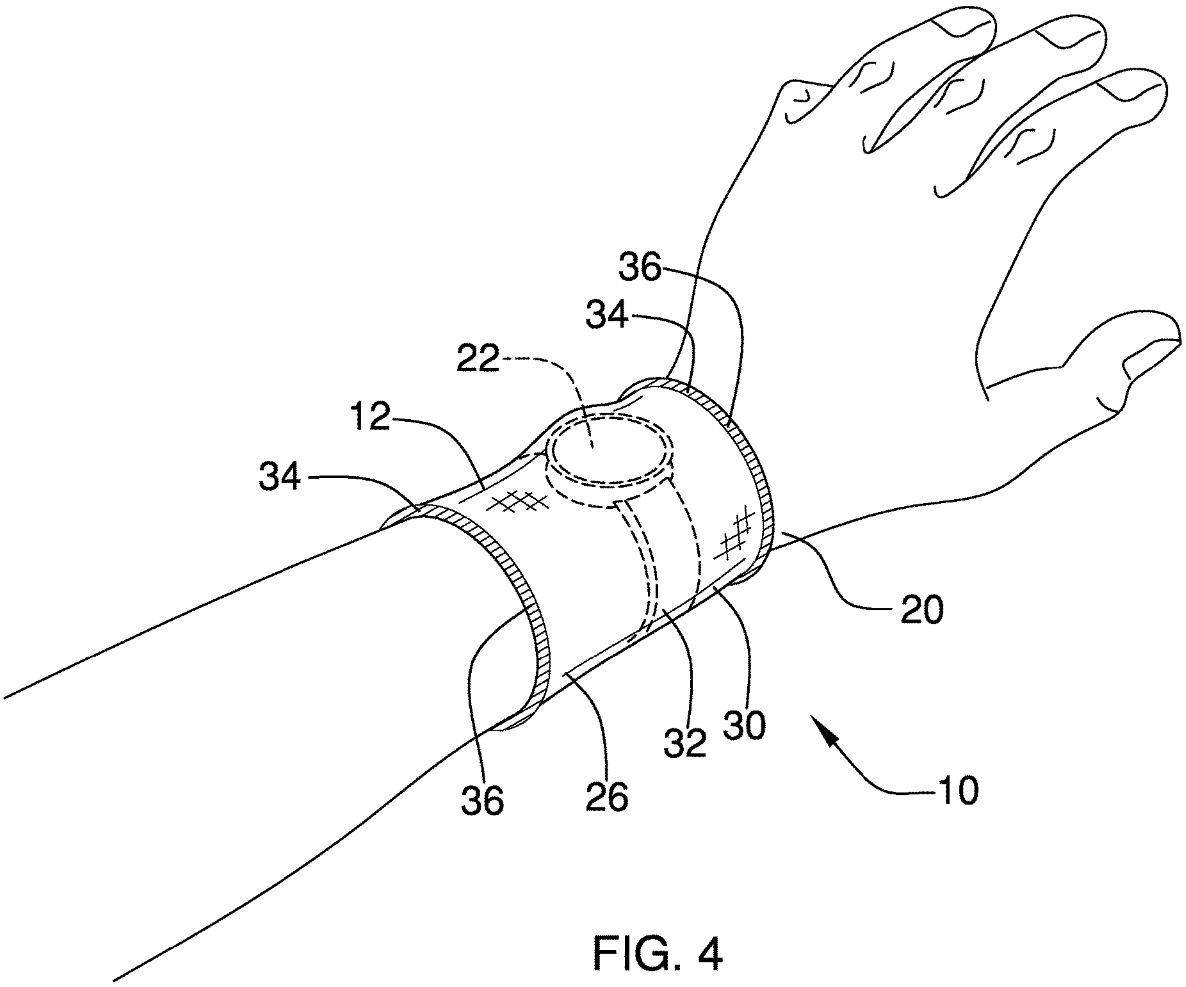
FIG. 4 is an in-use view of an embodiment of the disclosure.
Figure 5:
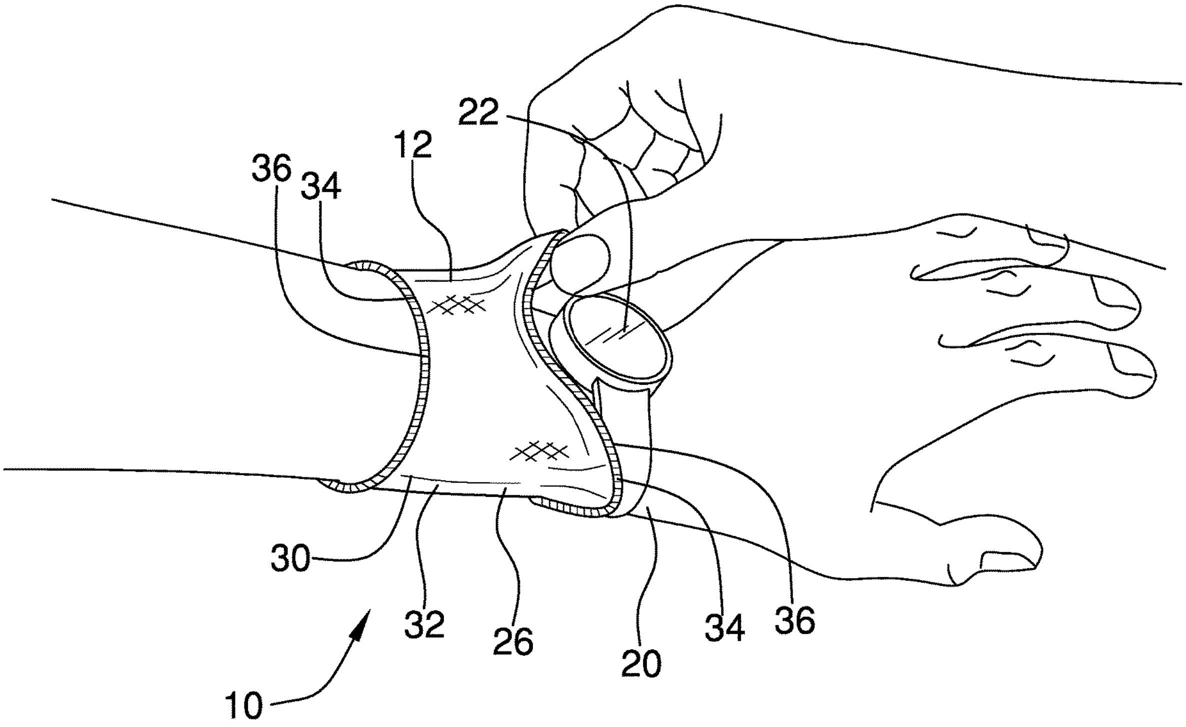
FIG. 5 is an in-use view of an embodiment of the disclosure.

With reference now to the drawings, and in particular to FIGS. 1 through 5 thereof, a new watch protection device embodying the principles and concepts of an embodiment of the disclosure and generally designated by the reference numeral 10 will be described.

As best illustrated in FIGS. 1 through 5, the protective wristwatch sleeve device 10 generally comprises a cylindrical sleeve 12 defining an interior space 14. The sleeve 12 has a pair of edges 16, each of which defining an associated opening 18 to the interior space 14. The sleeve 12 is elastically stretchable and is configured for stretching for wearing about a wrist 20 and a wristwatch 22, thereby shielding the wristwatch 22 from a debris. In this detailed description and in the claims, the term "wristwatch" includes any timepiece, smart device, jewelry, or other like item worn on the wrist 20 which could be scratched by the debris. The sleeve 12 including an inner layer 24 and an outer layer 26, each of which is cylindrical. The inner layer 24 is adjacent to the interior space 14 and has an inner surface 28 facing the interior space 14. The inner layer 24 is elastically stretchable and soft and is configured for abutting the wristwatch 22 when the sleeve 12 is worn. In this detailed description and in the claims, the term "soft" describes a material which will not scratch the wristwatch 20 when frictionally engaging it. The inner layer 24 may be constructed of microfiber fabric or like material, "microfiber fabric" being a fabric constructed of synthetic fibers (most commonly polyester) having a diameter of less than 10.0 micrometers.

The outer layer 26 of the sleeve 12 is adjacent to the inner layer 24 and is also elastically stretchable. The outer layer 26 is formed of a knitted thread 30 and has an outer surface 32 facing away from the inner layer 24. The sleeve 12 also includes a pair of rims 34, each of which extends along an associated edge 16 of the pair of edges 16. Each rim 34 is thicker than a thickness between the inner surface 28 and the outer surface 32 and is configured for facilitating gripping of each associated edge 16. Each rim 34 is constructed of an associated rim thread 36 of a pair of rim threads 36 which is stitched about the associated edge 16. An indicium 38 is positioned on the outer surface 32 and is centered between the pair of edges 16.

In use, the sleeve 12 is worn about the wrist 20 and the wristwatch 22 such that the inner surface 28 of the inner layer 24 abuts the wristwatch 22. In this position, the sleeve 12 will shield the wristwatch 22 from damage due to the debris. If the wristwatch 22 needs to be accessed or viewed while being worn, such as when the time needs to be read, a rim 34 is gripped and pulled back to expose the wristwatch 22. The rim 34 is released back to the worn position when the wristwatch 22 no longer requires accessing or viewing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A protective wristwatch sleeve device comprising:

a sleeve, said sleeve defining an interior space, said sleeve having a pair of edges, each said edge defining an associated opening to said interior space, said sleeve being elastically stretchable, said sleeve being configured for stretching for wearing about a wrist and a wristwatch, thereby shielding the wristwatch from a debris, said sleeve having an inner layer adjacent to said interior space, said inner layer having an inner surface facing said interior space, said inner layer being elastically stretchable, said inner layer being soft, said inner layer being configured for abutting the wristwatch when the sleeve is worn, said sleeve including an outer layer, said outer layer being elastically stretchable, said outer layer having an outer surface facing away from said inner layer; and said sleeve including a pair of rims, each said rim extending along an associated edge of said pair of edges, each said rim being thicker than a thickness between said inner surface and said outer surface, each said rim being configured for facilitating gripping of each associated edge, each said rim having an elliptical cross-sectional shape, an interior surface of said sleeve being flush with and joined to a minor axis of each of said rims.

2. The device of claim 1, further comprising said sleeve being cylindrical.

3. The device of claim 1, further comprising said outer layer being adjacent to said inner layer.

4. The device of claim 1, further comprising said outer layer being formed of a knitted thread.

5. The device of claim 1, further comprising each said rim being constructed of an associated rim thread of a pair of rim threads being stitched about said associated edge.

6. The device of claim 1, further comprising an indicium, said indicium being positioned on said outer surface.

7. The device of claim 6, further comprising said indicium being centered between said pair of edges.

8. The device of claim 6, further comprising said inner layer being constructed of microfiber.

9. A protective wristwatch sleeve device comprising:

a sleeve, said sleeve being cylindrical, said sleeve defining an interior space, said sleeve having a pair of edges, each edge defining an associated opening to said interior space, said sleeve being elastically stretchable, said sleeve being configured for stretching for wearing about a wrist and a wristwatch, thereby shielding the wristwatch from a debris, said sleeve including an inner layer, said inner layer being cylindrical, said inner layer being adjacent to said interior space, said inner layer having an inner surface facing said interior space, said inner layer being elastically stretchable, said inner layer being soft, said inner layer being configured for abutting the wristwatch when the sleeve is worn, said sleeve including an outer layer, said outer layer being cylindrical, said outer layer being adjacent to said inner layer, said outer layer being elastically stretchable, said outer layer being formed of a knitted thread, said outer layer having an outer surface facing away from said inner layer, said sleeve including a pair of rims, each said rim extending along an associated edge of said pair of edges, each said rim being thicker than a thickness between said inner surface and said outer surface, each said rim being configured for facilitating gripping of each associated edge, each said rim having an elliptical cross-sectional shape, an interior surface of said sleeve being flush with and joined to a minor axis of the cross-sectional shape of each of said rims, each said rim being constructed of an associated rim thread of a pair of rim threads being stitched about said associated edge; and an indicium, said indicium being positioned on said outer surface, said indicium being centered between said pair of edges.

* * * * *